United States Patent [19]

Matsuura

[11] Patent Number: 5,597,177
[45] Date of Patent: Jan. 28, 1997

[54] STEERING WHEEL PAD STRUCTURE

[75] Inventor: Naoki Matsuura, Aichi-ken, Japan

[73] Assignee: Kabushiki Kaisha Tokai-Rika-Denki-Seisakusho, Aichi-ken, Japan

[21] Appl. No.: 424,475

[22] PCT Filed: Nov. 11, 1993

[86] PCT No.: PCT/JP93/01650

§ 371 Date: Jan. 12, 1995

§ 102(e) Date: Jan. 12, 1995

[87] PCT Pub. No.: WO94/11230

PCT Pub. Date: May 26, 1994

[30] Foreign Application Priority Data

Nov. 13, 1992 [JP] Japan .................. 4-078286 U

[51] Int. Cl.⁶ .................................. B60R 21/16
[52] U.S. Cl. .............. 280/731; 200/61.55; 280/728.2; 280/750; 280/751
[58] Field of Search ................... 280/731, 728.2, 280/728.1, 750, 751; 200/61.54, 61.55, 61.56

[56] References Cited

U.S. PATENT DOCUMENTS

| 4,325,568 | 4/1982 | Clark et al. | 200/61.55 |
| 4,644,817 | 2/1987 | Albrecht et al. | 280/750 |
| 4,963,704 | 10/1990 | Buma et al. | 200/61.55 |
| 5,239,147 | 8/1993 | Allard et al. | 200/61.55 |

FOREIGN PATENT DOCUMENTS

| 560355 | 9/1985 | European Pat. Off. |
| 3509058 | 9/1993 | Germany . |
| 1262255 | 2/1989 | Japan . |
| 2143734 | 12/1990 | Japan . |
| 4274967 | 9/1992 | Japan . |

OTHER PUBLICATIONS

European Search Report.

*Primary Examiner*—Eric D. Culbreth
*Attorney, Agent, or Firm*—Sixbey Friedman Leedom & Ferguson; Thomas W. Cole

[57] ABSTRACT

A steering wheel pad structure in which an energy absorbing member is mounted to a steering wheel separately and independently of a pad so that the energy absorbing member is prevented from moving in accordance with movement of the pad when the pad is pressed in order to operate a horn switch. When the pad is pressed, a small pressing force suffices, and operation of the horn switch can be effected smoothly.

5 Claims, 2 Drawing Sheets

STEERING WHEEL PAD STRUCTURE

TECHNICAL FIELD

The present invention relates to a steering wheel pad structure in which a horn switch is operated by pressing, against the urging force of an elastic member, a pad which is mounted to a steering wheel.

BACKGROUND TECHNOLOGY

In an air bag device provided in the steering wheel of a vehicle, the air bag device and a pad which houses the air bag device are formed as a single module. This module is supported at a steering wheel via an elastic body. Further, a horn switch is disposed between the module and the steering wheel. By pressing the pad against the urging force of the elastic member and moving the pad and the air bag device, the horn switch is operated.

However, in conventional steering wheel pad structures, as described above, the elastic body supports not only the pad but also the air bag device. Therefore, it is necessary to make the spring constant of the elastic body large and urge the pad and the air bag device toward the vehicle occupant. Accordingly, there is a drawback in that when the horn switch is operated, it is necessary to press the pad with a large pressing force, and operation of the horn switch cannot be effected smoothly.

In order to be able to operate the horn switch without requiring a large pressing force, the horn switch is provided at the steering wheel rim or spokes. By pressing this horn switch, the horn is operated. However, there is a drawback in that the horn switch is difficult to operate when the steering wheel is being turned.

SUMMARY OF THE INVENTION

The present invention has taken the above into consideration, and an object of the present invention is to obtain a steering wheel pad structure in which operation of a horn switch can be effected smoothly.

In the entire steering wheel pad structure of the present invention, a pad, which houses an energy absorbing member which absorbs inertial movement force of a vehicle occupant, is supported at a steering wheel via an urging member, and by pushing the pad against the urging force of the urging member, the entire pad moves and a horn switch is operated, the feature of the invention being that the energy absorbing member is mounted to the steering wheel separately and independently of the pad so that the energy absorbing member does not move in accordance with movement of the entire pad.

In the steering wheel pad structure of the present invention, the energy absorbing member, which absorbs the inertial movement force of the vehicle occupant, is mounted to the steering wheel separately and independently of the pad. Namely, in the present invention, there is no need for the urging member (e.g., an elastic body) to support the energy absorbing member. As compared with a case in which the pad and the energy absorbing member are formed as a single module, the spring constant of the elastic can be made small, and the force required at the time of operating the horn switch can be made small.

Because the present invention is structured as described above, in accordance with the steering wheel pad structure of the present invention, there is a superior effect in that operation of the horn switch can be effected smoothly.

DETAILED DESCRIPTION OF THE PREFERRED EMBODIMENTS

Figure 1:
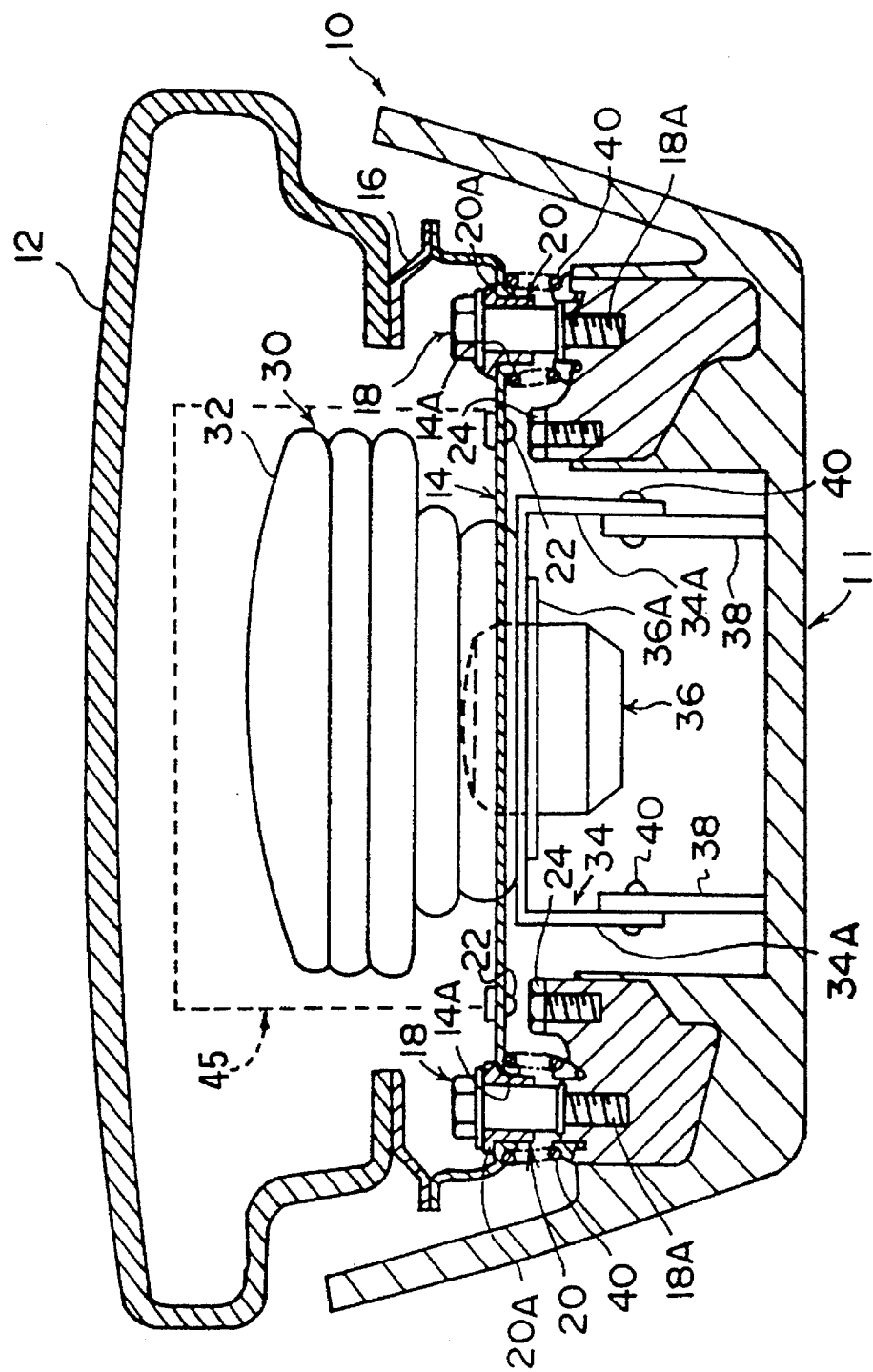
FIG. 1 illustrates a steering wheel pad structure of an embodiment of the present invention, and is a view in the direction of the arrow along the line 2—2 of FIG. 2 in a state in which an air bag device is mounted.

Hereinafter, a steering wheel pad structure of an embodiment of the present invention will be described in accordance with FIG. 1 and FIG. 2.

A steering pad 12 is disposed in a central portion of a steering wheel 10. An air bag device 30 serving as an energy absorbing member and illustrated in FIG. 1 is disposed between the steering pad 12 and the steering wheel 10. The steering pad 12 is fixed to plates for fixing 16 which are fastened to contact plates 14 by unillustrated bolts.

Figure 2:
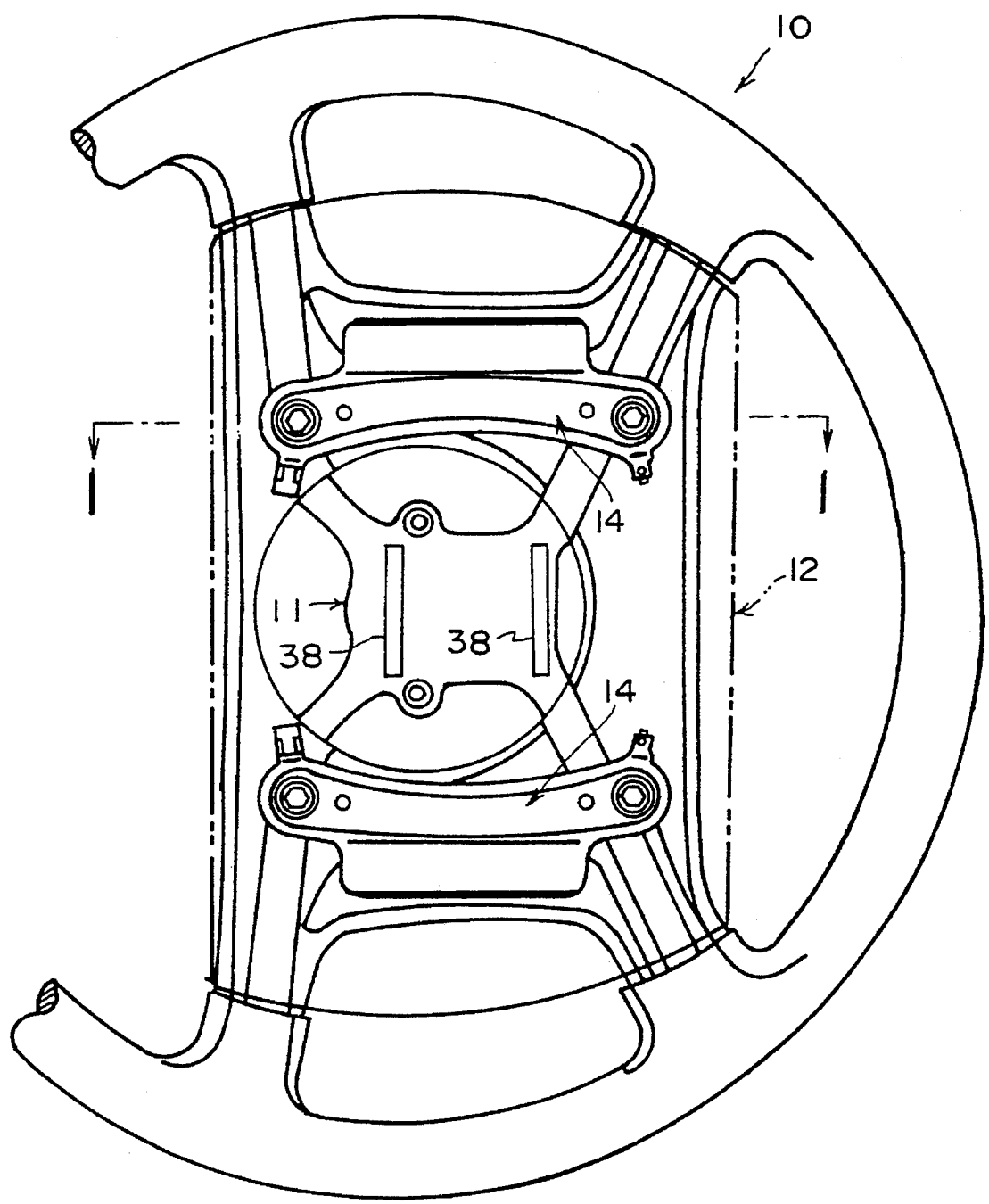
FIG. 2 is a plan view of the embodiment of the present invention and illustrating a steering wheel before the air bag device has been mounted.

As illustrated in FIG. 2, a pair of the contact plates 14 are provided at a predetermined interval in the vertical direction of FIG. 2 at the steering pad 12 side of a hub 11 of the steering wheel 10. As illustrated in FIG. 1 as well, a through hole 14A is formed in each longitudinal direction (left-right direction in FIG. 2) end portion of each contact plate 14. The intermediate portion of a shaft 18 is inserted through the through hole 14A. A bush 20 is fixed to the intermediate portion of the shaft 18. The contact plate 14 is vertically guided in FIG. 1 by the outer peripheral portions of the bushes 20. A female screw 18A is formed at the bottom end of the shaft 18. The female screw 18A is screwed and fixed to the hub 11. A flange portion 20A is formed at the top end portion of the bush 20. Movement of the contact plate 14 upwardly in FIG. 1 is restricted by each flange portion 20A.

Movable contacts 22 are mounted to each of the contact plates 14 in vicinities of the pair of through holes 14A at the surface at the side opposite the steering pad 12. Fixed contacts 24 are fixed to the hub 11 of the steering wheel 10 in correspondence with the respective movable contacts 22. The movable contacts 22 and the fixed contacts 24 form the horn switch.

Compression coil springs 40 are interposed between the hub 11 of the steering wheel 10 and the peripheral portions of the pair of through holes 14A at the surface of the contact plate 14 at the side opposite the steering pad 12, with the intermediate portions of the shafts 18 inserted respectively through the compression coil springs 40. The contact plates 14 are always urged upward in FIG. 1, i.e., in a direction in which the movable contacts 22 move away from the fixed contacts 24. When a vehicle occupant pushes the steering pad 12 downward in FIG. 1 against the urging force of the compression coil springs 40, the contact plates 14 also move downward. The movable contacts 22 and the fixed contacts 24 contact, and the horn switch is turned on. When pressing of the steering pad 12 is released, the steering pad 12 together with the contact plates 14 are moved upward in FIG. 1 by the urging force of the compression coil springs 40. The movable contacts 22 move apart from the fixed contacts 24, and the horn switch is turned off.

The air bag 30 is equipped with a base plate 34. The left and right end portions in FIG. 1 of the base plate 34 are bent downward at a right angle so as to form mounting portions 34A. The mounting portions 34A are fixed by rivets 41 to a pair of fixed plates 38 which are fixed to the hub 11 of the steering wheel 10. An inflator 36 and a bag body 32 are attached to the base plate 34.

Namely, in the present embodiment, the air bag device 30 is separated from the steering pad 12. Accordingly, because the load of the air bag device 30 is not applied to the compression coil springs 40, the spring constants of the compression coil springs 40 can be made small. Thus, when the steering pad 12 is pushed, there is no need for a large force, and operation of the horn switch can be effected smoothly.

The inflator 36 is substantially cylindrical, and the half of the inflator 36 at the vehicle occupant side is inserted through an unillustrated circular hole formed in the central portion of the base plate 34. A square flange 36A which extends in the radial direction of the inflator 36 is formed at the axial direction intermediate portion of the inflator 36. The inflator 36 is fixed to the surface of the base plate 34 opposite the vehicle occupant side by unillustrated bolts or the like via a flange 36A.

A plurality of gas holes (omitted from the figures) are formed in the vehicle occupant side peripheral surface of the inflator 36. Further, an activating device (omitted from the figures) which operates when the vehicle suddenly decelerates is disposed in an axial core portion of the inflator 36. An unillustrated detonator, booster and gas generating agent are accommodated at the outer periphery of the activating device. Accordingly, when the vehicle suddenly decelerates, the activating device operates, and ignites the detonator. The gas generating agent combusts via the booster, and a large quantity of gas is generated. This gas flows into the bag body 32 from the gas holes. The bag body 32 thereby inflates, the steering pad 12 ruptures, and the bag body 32 is interposed between the steering wheel 10 and the vehicle occupant.

The mounting process for the steering wheel pad structure having the horn of the present invention will be described hereinafter together with the operation of the present embodiment.

The inflator 36 and the bag body 32 are mounted to the base plate 34. Further, the mounting portions 34A of the base plate 34 are fixed by the rivets 41 to the fixed plates 38 which are fixed to the hub 11 of the steering wheel 10. The air bag device 30 is thereby fixed to the steering wheel 10.

Next, the shafts 18 to which the bushes 20 are fixed are inserted through the through holes 14A of the contact plates 14. Further, the shafts 18 are screwed and fixed to the hub 11 with the shafts 18 inserted through the compression coil springs 40. Then, the steering wheel pad 12 is fixed to the contact springs 14 via the plates for fixing 16. In this way, when the steering pad 12 is pushed against the urging force of the compression coil springs 40, the contact plates 14 also move downward, and the horn switch is turned on. When pressing of the steering wheel 10 is released, the contact plates 14 return to their original positions due to the urging force of the compression coil springs 40, and the horn switch is turned off. As illustrated in FIG. 1, no matter what portion of the steering pad 12 is pushed, the entire steering pad 12 moves, and the contact plates 14 move downward so that the horn switch is turned on. Therefore, it is easy to operate the horn switch even when the steering wheel is being turned.

As described above, in the present embodiment, the air bag device 30 is not connected to the steering pad 12, and the load of the air bag device 30 is not applied to the compression coil springs 40. Therefore, the spring constants of the compression coil springs 40 can be made small by that much. Accordingly, when the steering pad 12 is pushed, operation of the horn switch can be effected smoothly without the need for a large force.

In the above-described embodiment, a case in which the air bag device 30 was provided as an example of the energy absorbing member between the steering wheel 10 and the steering pad 12 was described. However, in place of the air bag device 30, a cushion member 45 (indicated schematically in phantom) which absorbs the inertial movement force of the vehicle occupant may be fixed to the base plate 34. In this case as well, the cushion member is fixed to the steering wheel 10 separately and independently of the steering pad 12. Therefore, in the same way as in the above-described embodiment, the spring constants of the compression coil springs 40 can be made small, and when the steering pad 12 is pressed, operation of the horn switch can be effected smoothly without the need for a large force.

I claim:

1. A steering pad structure in which a pad, which houses an energy absorbing member which absorbs inertial movement force of a vehicle occupant, is supported at a steering wheel via an urging member, and by pushing said pad against the urging force of said urging member, the entire pad moves and a horn switch is operated, wherein said energy absorbing member is mounted to said steering wheel separately and independently of said pad so that said energy absorbing member dos not move in accordance with movement of said entire pad, and said steering wheel has a base portion, and said pad is mounted to said base portion via said urging member, and said energy absorbing member is mounted to said base portion, and said pad includes a contact plate portion having a contact of said horn switch, and said contact plate portion being mounted to said base portion via said urging member.

2. A steering wheel pad structure according to claim 1, wherein a base plate member is mounted to said base portion, and said energy absorbing member is mounted to said base plate member.

3. A steering wheel pad structure according to claim 1, wherein said energy absorbing member is formed from an air bag device.

4. A steering wheel pad structure according to claim 1, wherein said energy absorbing member is formed from a cushion member.

5. A steering wheel pad structure in which a pad, which houses an air bag device which absorbs inertial movement force of a vehicle occupant, is supported at a steering wheel via an urging member, and by pushing said pad against the urging force of said urging member, the entire pad moves and a horn switch is operated, wherein said air bag device is mounted to said steering wheel separately and independently of said pad so that said air bag device does not move in accordance with movement of said entire pad.

* * * * *